(No Model.)
L. RIBOURT.
Apparatus for Preserving Alimentary Substances by Means of Cold.
No. 235,702. Patented Dec. 21, 1880.
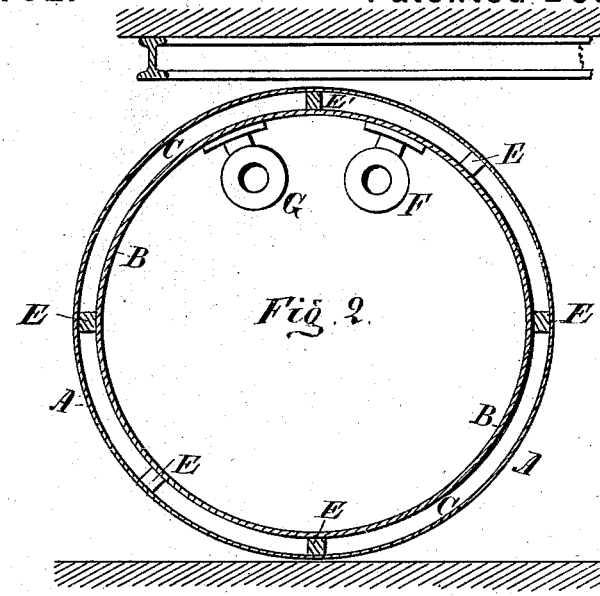
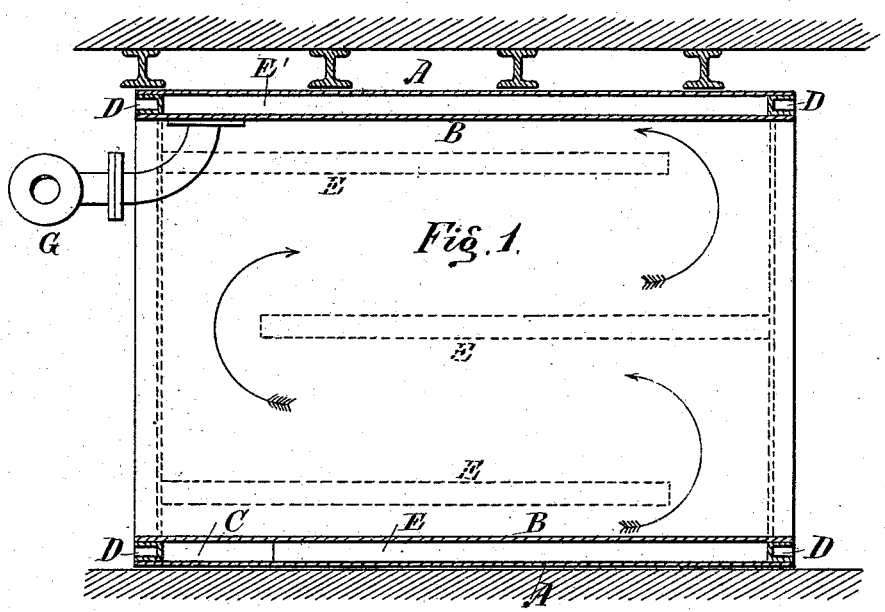
Witnesses
Wm. A. McElvee.
H. A. Daniels
Inventor
Léon Ribourt
pr Henry Orth
atty.

UNITED STATES PATENT OFFICE.

LÉON RIBOURT, OF PARIS, FRANCE, ASSIGNOR TO COMPAGNIE INDUS-
TRIELLE DES PROCÉDÉS RAOUL PICTET, OF SAME PLACE.

APPARATUS FOR PRESERVING ALIMENTARY SUBSTANCES BY MEANS OF COLD.

SPECIFICATION forming part of Letters Patent No. 235,702, dated December 21, 1880.

Application filed July 19, 1880. (No model.) Patented in France February 18, 1880.

*To all whom it may concern:*

Be it known that I, LÉON RIBOURT, a citizen of France, residing in the city of Paris, Republic of France, have invented new and useful Improvements in Apparatus for Preserving Alimentary Substances by Means of Cold, for which I have obtained Letters Patent in France, dated February 18, 1880, No. 135,134; and I do hereby declare that the following is a full, clear, and exact description of the invention, which will enable others skilled in the art to which it appertains to make and use the same.

This apparatus relates, generally, to the preservation of alimentary substances by means of cold, but more particularly to the transport by sea of fresh meat from South America and other countries to Europe.

As regards more especially the transport of fresh meat on board ship: In order to counteract the heating effects due to the contact of the sea with the sides of the ship, to the contact of the external air, and to the radiation from the sun in the tropics, it is necessary to construct around the mass of the cargo a kind of envelope which is powerfully cooled, and even to insert cold surfaces into the very mass itself, for the purpose of maintaining therein the low temperature necessary for the perfect preservation of the meat. The usual source of cold, or rather the apparatus which absorbs the heat, is an ice-making or cooling machine. The intermediate vehicle employed between the mass of meat to be cooled and the ice-making or cooling machine is preferably an aqueous solution of chloride of magnesium, which has the advantages of being absolutely neutral, (which effects the preservation of the metal of the apparatus,) of not leaving a deposit, and of being very fluid. It may be dissolved in the proportion of fifty per cent., by weight, in water, and makes a liquid incongealable at 30° centigrade.

The apparatus constituting the cold surfaces are the refrigerating-cylinders, which form the special feature of this invention. They are distributed near each other in the "between-decks" of the ship. They are connected to the ice-making or cooling machine by pipes so arranged that the delivery and return of the incongealable cold liquid can be regulated from the deck above so as to place the temperature of the space containing the meat under complete control at all points. The meat is stowed inside and outside these cylinders, and there may be left between the side of the ship (which is lined with a bad conductor of heat) and the cylinders nearest to this side a space or passage sufficient for a person to pass along for the purpose of inspection. This small space or passage may be left in any other suitable position, and there may be one or more such passages, but preferably so arranged as not to leave too much space unoccupied. A refrigerator is formed of two concentric cylinders, of sheet or plate iron, of from three to five millimeters thickness, according to circumstances.

In the drawings annexed hereto, Figure 1 is a longitudinal section, and Fig. 2 a transverse section, of a refrigerator shown in place between the decks of a vessel.

These two cylinders A and B—of three meters length, for example—have between them an annular space, C, of, say, fifty millimeters width, the external diameter of the largest cylinder, A, being, for example, about two meters. They are connected together at their two ends by two U-shaped iron rings or channel-irons, D D, to which the sheet or plate iron cylinders are riveted, in order to make water-tight the said annular space C, in which the circulation of the cold incongealable liquid takes place.

To secure a proper circulation of the cold incongealable liquid, and to obtain a uniform exchange of heat at all points of the surface of the refrigerator, there are placed between the two sheet or plate iron cylinders wooden partitions E E E, of, say, fifty millimeters square. Supposing there are eight of these partitions, the first, E', will be of the full internal length between the two rings or channel-irons D D; the others will be shorter, and placed so as to touch alternately one ring or channel-iron and then the other, forming a circuitous passage. (Illustrated by arrows in Fig. 1 of the drawings.)

The inlet-pipe F, for the incongealable liquid, is placed in the inside of the cylinder B, between the first and second partitions, and the outlet-pipe G, for the liquid, is also placed inside the cylinder B, between the eighth and the first partitions. These wooden partitions, besides forming the circuitous passage for the incongealable liquid, maintain the distance of the inner and outer cylinders from each other and strengthen the apparatus, distributing the shocks and pressures to which the outside or inside of the cylinders may be subjected.

As regards the internal pressure of the liquid, which determines the circulation, the cylindrical form resists it naturally without change of form, and the thickness of the sheet or plate iron is more than sufficient for this relatively small pressure.

In respect of economy, of first cost, and of space occupied in the ship, this kind of apparatus is especially advantageous. It allows also of a sufficiently active circulation of the cold liquid for securing the maintenance of the low temperature necessary to the perfect preservation of the meat.

In order to reduce to a minimum the space occupied by the cylindrical refrigerators when they are not required for the preservation of meat or other substances, they may be made of various diameters, so as to admit of being packed inside one another, like the tubes of a telescope. The central space, which remains empty in the smallest after they are thus packed together, may be used for the stowage of various products, such as skins or other matters. The apparatus, thus arranged telescopically, will occupy about a tenth part only of the space that the cold-chamber occupies in the ship, leaving the remaining nine-tenths available for any purpose for which it may be suitable.

Having now described the construction and operation of my invention, to which I have given the name of "The Double-Cylinder Refrigerator," I would have it understood that what I claim as my invention is—

The refrigerating apparatus consisting of an outer cylinder, A, and an inner cylinder, B, with an annular space, C, between them, such annular space being closed at both ends and fitted with partitions E E, forming a circuitous channel, to the two ends of which are connected the inlet and outlet pipes F and G, for the circulation of incongealable liquid, the whole constructed, arranged, and operating substantially as hereinbefore described, and for the purposes herein set forth.

LÉON RIBOURT.

Witnesses:
M. SAUTTER,
ED. SCHMIDT.